United States Patent
Xian et al.

(10) Patent No.: US 7,151,357 B2
(45) Date of Patent: Dec. 19, 2006

(54) PULSE FREQUENCY MODULATION FOR INDUCTION CHARGE DEVICE

(75) Inventors: Bo-Xun Xian, Taipei Hsien (TW); Ren-Kai Zheng, Taipei Hsien (TW); Shi-Hao Lu, Taipei Hsien (TW)

(73) Assignee: KYE Systems Corporation, Taipei Hsien (TW)

( * ) Notice: Subject to any disclaimer, the term of this patent is extended or adjusted under 35 U.S.C. 154(b) by 85 days.

(21) Appl. No.: 10/902,001

(22) Filed: Jul. 30, 2004

(65) Prior Publication Data

US 2006/0022636 A1   Feb. 2, 2006

(51) Int. Cl.
*H02J 7/00*   (2006.01)

(52) U.S. Cl. ...................................... 320/108
(58) Field of Classification Search ............... 320/106, 320/108, 128
See application file for complete search history.

(56) References Cited

U.S. PATENT DOCUMENTS

| | | | |
|---|---|---|---|
| 5,600,225 A * | 2/1997 | Goto ........................... | 320/108 |
| 6,016,046 A * | 1/2000 | Kaite et al. .................. | 320/108 |
| 6,040,680 A * | 3/2000 | Toya et al. .................. | 320/108 |
| 6,057,668 A * | 5/2000 | Chao ........................... | 320/108 |
| 6,118,249 A * | 9/2000 | Brockmann et al. ........ | 320/108 |
| 6,291,973 B1 * | 9/2001 | Lee .............................. | 320/128 |
| 6,744,698 B1 * | 6/2004 | Koyama et al. ............. | 368/204 |
| 2004/0189246 A1 * | 9/2004 | Bulai et al. .................. | 320/108 |

* cited by examiner

*Primary Examiner*—Karl Easthom
*Assistant Examiner*—Samuel Berhanu
(74) *Attorney, Agent, or Firm*—Troxell Law Office, PLLC

(57) ABSTRACT

The present invention is related to a pulse frequency modulation for induction charge device, which comprises a pulse frequency modulation for induction charge device being provided to charge a portable electronic device, wherein, the portable electronic device comprises a induction coil, which comprises: an electric magnetic field generate and the secondary coil react circuit; a detection and modulation generate circuit; and a control switch circuit; whereby, the detection and modulation generate circuit could generate pulse singles with various frequencies according to the load varying generated due to distance varying between the portable electronic device and the charged device, and charge to the portable electronic device according the pulse singles so as to reach the goal of effective management the power.

16 Claims, 5 Drawing Sheets

PULSE FREQUENCY MODULATION FOR INDUCTION CHARGE DEVICE

BACKGROUND OF THE INVENTION

1. Field of the Invention

The present invention relates to a pulse frequency modulation for induction charge device and, more particularly, relates to a pulse frequency modulation for induction charge device which can generate pulse singles with various frequencies according to the load varying generated due to distance varying between the portable electronic device and the charged device, and charge to the portable electronic device according to the pulse singles so as to reach the goal of effective management the power.

2. Description of the Related Art

In general, the electronic portable device or computer peripheral device, includes but not limited to electric toothbrush, electric shaver of the general can take reaction type or the peripheral device of computer, include but not confine to electronic toothbrush, shaver . . . , etc home appliances, or wireless computer peripheral device, such as wireless mouse, wireless earphone, wireless game controller . . . , etc computer peripheral devices, all have a charge device, in order to charge the electronic portable device by using the charge device. At present, there is some prior art charge devices use contact pad(s) for contacting to the electronic portable device for charging, and some prior art charge devices use reacting method for charging. Among them, the prior art charge devices used contact pad(s) have already been eliminated gradually due to their bad contacting drawback.

And the computer peripheral charge device that charge by way of reaction method, for example Taiwan issued patent No. 551560(applied on Mar. 26, 2002 and published on, Sep. 1, 2003) "The reaction type power supply device of a wireless mouse" is related a reaction type power supply device of a wireless mouse, which mainly comprises: a wireless mouse and a mouse pad, wherein the characteristic of the patent is: a wireless mouse having a induction coil positioned at a proper location of the interior bottom portion, and parallel to a capacitor of a power supply circuit to form a parallel resonance circuit, and then passing a path consisted of diode(s) to connect to a charging capacitor for providing power to the wireless signal transmission circuit of the wireless mouse; a mouse pad, is buried the induction coil inside, or used the printed circuit board method to form the induction coil, the induction coil is connected to a power line for inputting power; therefore, while the power is applied to the induction coil of the mouse pad for generating a electric wave, the electric wave signal is received by the induction coil inside the wireless mouse, and then generates a electromotive force (EMF), and the EMF is parallel to the capacitor for generating parallel resonance, thus making the signal pass through the diode(s) path and charge to the capacitor, meanwhile, outputs power to the wireless signal transmission circuit of the wireless mouse, such that let the wireless mouse can remote control and use the computer application, and the power of the wireless mouse is unfailing supply so as to avoid power fail or power insufficient case during using the wireless mouse. However, the prior par patent does not have ability to detect the load varying, the induction coil continually converting the power when the peripheral charge device need not to be charged, so that causes the power wasting due to power converting.

There is one another computer peripheral charge device that charge by way of reaction method, for example Taiwan issued patent No. 535341 (applied on Sep. 7, 2001 and published on, Jun. 1, 2003) "The wireless peripheral of information system with electric magnetic reaction type charge device" is related a wireless point device, wherein, the wireless point device can use a reaction charge device to charge. Wherein, the reaction charge device comprises: a base, having a platform therein; and a first induction coil, positioned at a place corresponding to the platform inside the base for converting a power into an electric magnetic field and transmitting it outward; while the wireless point device comprises: housing, having a contact surface corresponding to the platform; at least one control key, installed on the housing, for generating control signal according to the user's operation; a signal module, electrically connected to the control key, for outputting the control signal by way of wireless; a second induction coil, positioned at a place corresponding to the platform inside the base for receiving the electric magnetic field passing the contact surface by way of electric magnetic reacting; a power module, electrically coupled to the second induction coil, for converting the electric magnetic field received by the second induction coil into the power; and power storage module, for storing the power of the power module and providing the power required to operate the wireless point device; wherein, while the user placing the contact surface of the wireless point device on the platform of reaction charge device, the second induction coil of wireless point device will receive the electric magnetic field generated by the first induction coil, so that the reaction charge device provides power to the wireless point device. However, the prior par patent also does not have ability to detect the load varying, the induction coil continually converting the power when the peripheral charge device need not to be charged, so that causes the power wasting due to power converting.

There is still one another computer peripheral charge device that charge by way of reaction method, for example Taiwan issued patent No. 555286(applied on Dec. 7, 2001 and published on, Sep. 21, 2003) "The electric magnetic reaction charge device of a personal digital assistant" is related to a electric magnetic reaction charge device for a personal digital assistant (PDA), wherein, the electric magnetic reaction charge device of the PDA comprises: an electric magnetic reaction charge base, for converting a charging energy into a reaction current and passing to the PDA; and an electric magnetic reaction charge interface, for embedding the PDA into the electric magnetic reaction charge base and receiving the reaction current from the electric magnetic reaction charge base. The prior par patent uses electric magnetic reaction way to pass the electric energy. However, it also does not have ability to detect the load varying, the induction coil continually converting the power when the peripheral charge device need not to be charged, so that causes the power wasting due to power converting.

According to the aforesaid description, the contact type charge device has the following drawbacks: (1) the prior art charge devices used contact pad(s) have already been eliminated gradually due to their bad contacting drawback; (2) the charge devices do not have ESD (ESD/electro-static discharge) protecting ability due to the contact pad of the charge devices have been exposed in the air long time. Furthermore, the aforesaid reaction type charge devices, do not have ability to detect the load varying, the induction coil continually converting the power when the peripheral charge devices need not to be charged, so that causes the power wasting due to power converting. Therefore, there need a pulse frequency modulation for induction charge device which can generate pulse singles with various frequencies according to the load varying generated due to distance varying between the portable electronic device and the charged device, and charge to the portable electronic device according to the pulse singles so as to reach the goal of effective management the power and overcome the aforesaid drawbacks of the prior art.

SUMMARY OF THE INVENTION

The present invention has been accomplished under the circumstances in view. It is therefore the main object of the present invention to provide a pulse frequency modulation for induction charge device, which eliminates the aforesaid drawbacks.

According to one aspect of the present invention, the first object of the present invention is to provide a pulse frequency modulation for induction charge device. Particularly, the pulse frequency modulation for induction charge device comprises: a pulse frequency modulation for induction charge device being provided to charge a portable electronic device, wherein, the portable electronic device comprises a induction coil, pulse frequency modulation for induction charge device comprises: an electric magnetic field generate and the secondary coil react circuit; a detection and modulation generate circuit; and a control switch circuit; whereby, the detection and modulation generate circuit could generate pulse singles with various frequencies according to the load varying generated due to distance varying between the portable device and the charged device, and charge to the portable device according the pulse singles so as to reach the goal of effective management the power.

According to another aspect of the present invention, another object of the present invention is to provide a portable electronic device. Particularly, the portable electronic device comprises: an induction coil, could react the frequency varying generated by the electric magnetic field generate and the secondary coil react circuit and convert it becoming a power signal; a rectification circuit, coupled to the induction coil, for rectifying the power signal into a direct current power; a rechargeable battery, coupled to the rectification circuit, for providing the direct current power to the portable electronic device; and a device circuit, coupled to the rechargeable battery, for controlling the portable electronic device to execute relatively action.

These and other features, aspects, and advantages of the present invention will become apparent by a review of the following detailed description of the preferred embodiment of the invention and by reference to the following drawings.

DETAILED DESCRIPTION OF THE PREFERRED EMBODIMENT

Figure 1:
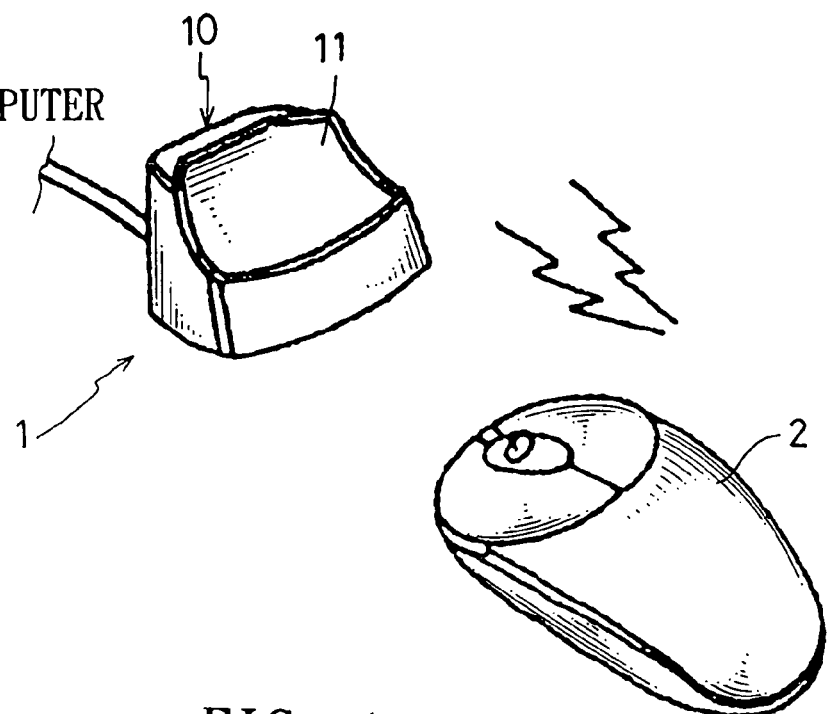
FIG. 1 illustrates a pulse frequency modulation for induction charge device communicating with a portable electronic device by wireless way according to one prefer embodiment of the present invention.

Referring to FIG. 1, which illustrates a pulse frequency modulation for induction charge device communicating with a portable electronic device by wireless way according to one prefer embodiment of the present invention. As shown in the FIG., the pulse frequency modulation for induction charge device 1 of the present invention comprises: a base seat 10, which comprises a reaction region 11 for positioning the portable electronic device 2 to charge. Wherein, the portable electronic device 2 of the present invention includes but not limited to electronic toothbrush, electronic shaver, etc household appliances, further comprises wireless computer peripheral device, such as wireless mouse, wireless earphone, wireless game controller . . . , etc computer peripheral device. The present invention uses the conventional mouse as an example, wherein the base seat 10 further can integrate a wireless signal receiver to work together.

Figure 2:
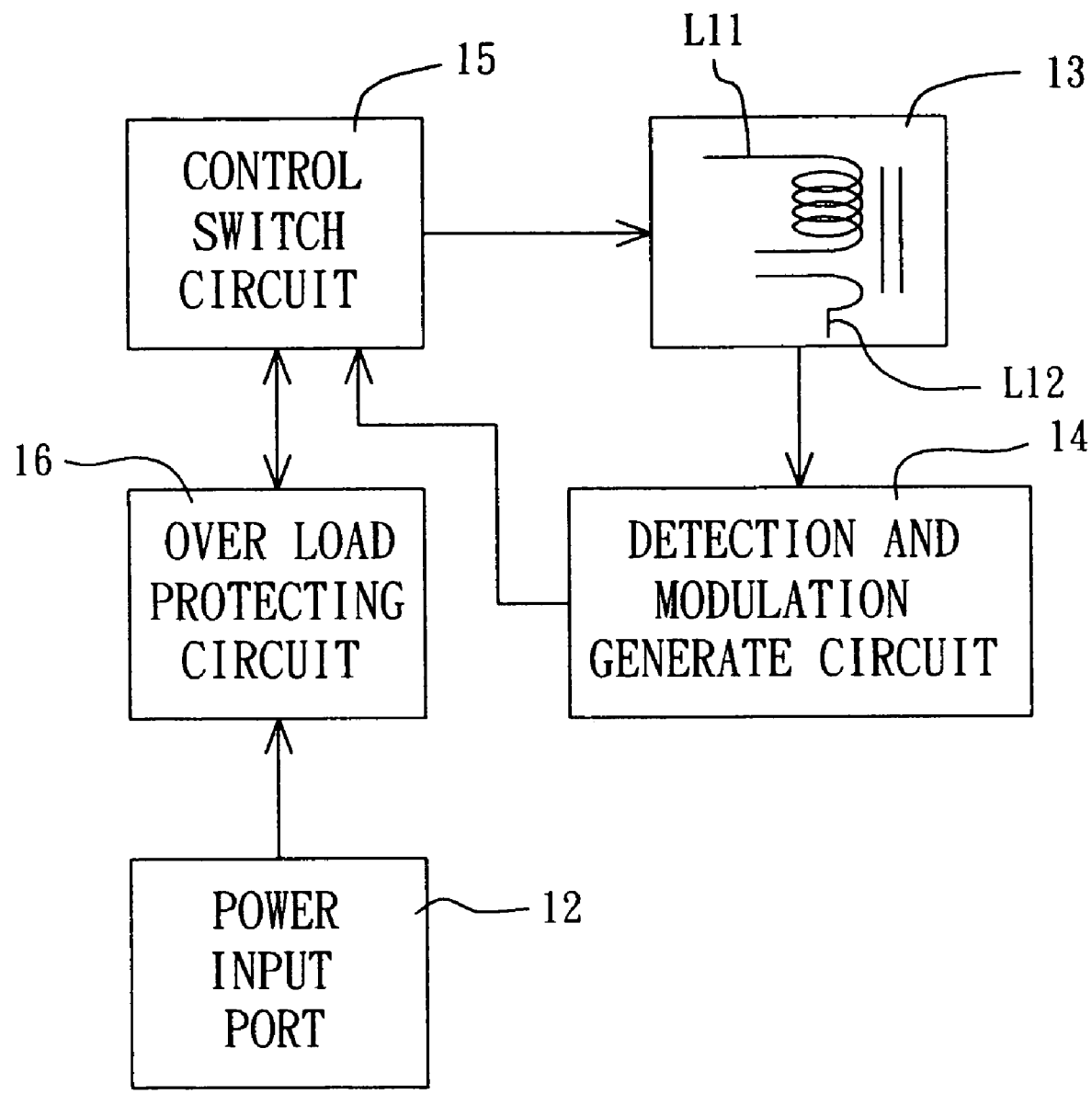
FIG. 2 is a block diagram showing the pulse frequency modulation for induction charge device according to one prefer embodiment of the present invention.

Referring to FIG. 2, which illustrates a block diagram showing the pulse frequency modulation for induction charge device according to one prefer embodiment of the present invention. As shown in the FIG., the pulse frequency modulation for induction charge device 1 of the present invention comprises: a power input port 12, an electric magnetic field generate and the secondary coil react circuit 13; a detection and modulation generate circuit 14 and a control switch circuit 15.

Wherein, the power input port 12 is coupled to the control switch circuit 15, for providing power to the pulse frequency modulation for induction charge device 1, and the power input port 12 for example but not limited to a direct current power from a USB or PS2 port or a external power adapter.

The electric magnetic field generate and the secondary coil react circuit 13 with a primary coil L11 and a secondary coil L12 is electric magnetic couple to the induction coil 21 (please refer to FIG. 3) of the portable electronic device 2, which can react the electric magnetic field varying due to the distance varying between the portable device 2 and the pulse frequency modulation for induction charge device 1, and generate electric magnetic field according to the pulse singles with various frequencies generated by the detection and modulation generate circuit 14.

The detection and modulation generate circuit 14, for example but not limited to a Pulse Frequency Modulation (refer as a PFM hereinafter) generate circuit, is coupled to the electric magnetic field generate and the secondary coil react circuit 13, for detecting the electromagnetic varying of the induction coil 21 and outputting pulse singles with various frequencies according to the electromagnetic varying.

The control switch circuit 15, for example but not limited to consist of transistor circuit, is coupled to the electric magnetic field generate and the secondary coil react circuit 13, for controlling transistor switch on or off according to the pulse singles generated by the detection and modulation generate circuit 14 so as to make the electric magnetic field generate and the secondary coil react circuit 13 generate the electric magnetic field. Furthermore, the present invention further comprises a over load protect circuit 16, for example but not limited to a transistor, is coupled to control switch circuit 15 for limiting the current passing the control switch circuit 15 so as to reach the goal of over current protecting.

Figure 3:
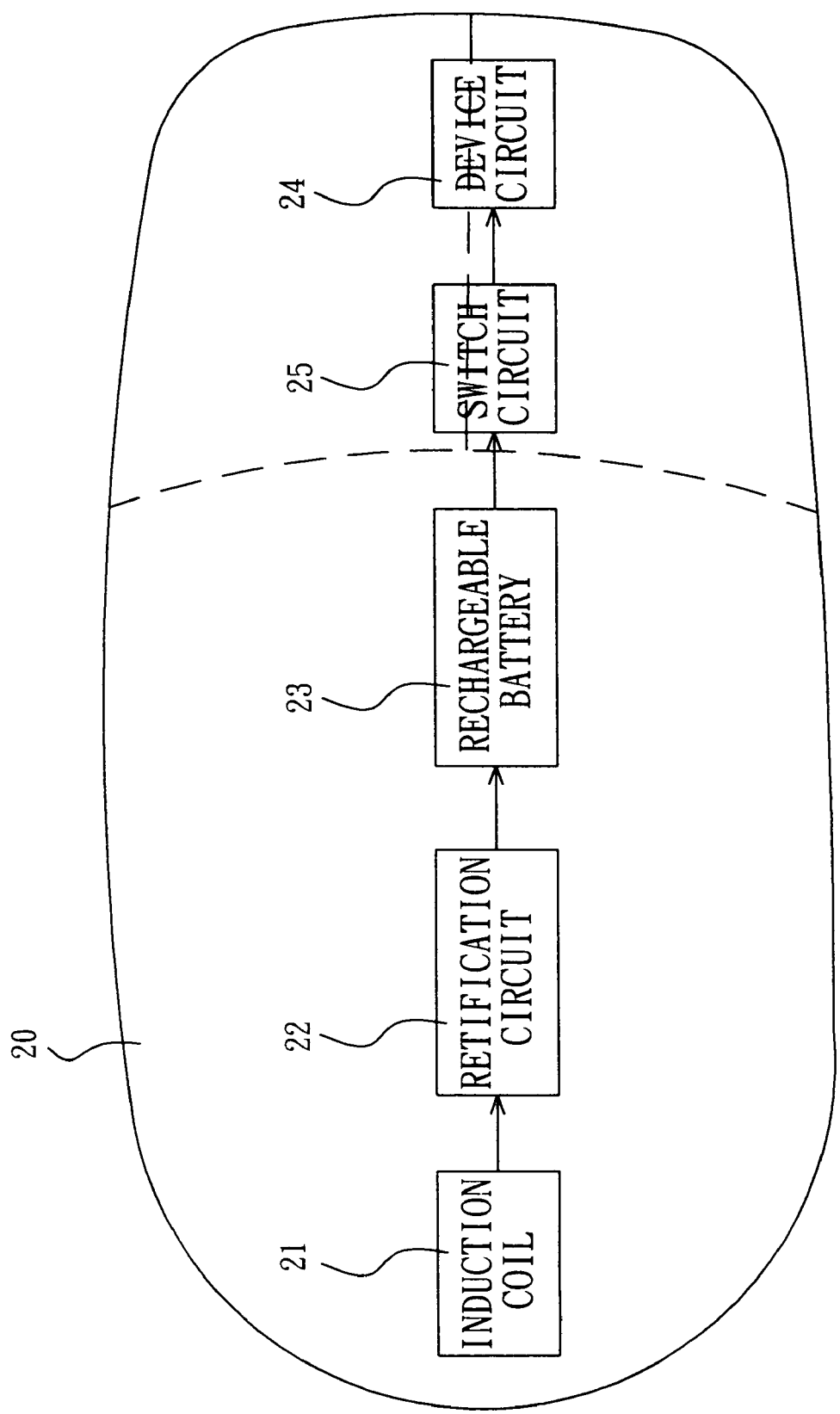
FIG. 3 is a block diagram showing the portable electronic device according to one prefer embodiment of the present invention.

Referring to FIG. 3, which illustrates a block diagram showing the portable electronic device according to one prefer embodiment of the present invention. As shown in the FIG., the portable electronic device 2 of the present invention comprises a housing 20, and the housing 20 can be positioned in the reaction region 11 of the base seat 10 for charging. Wherein, the portable electronic device 2 of the present invention further comprises: an induction coil 21; a rectification circuit 22; a rechargeable battery 23; and a device circuit 24.

The induction coil 21, is electric magnetic coupled to the electric magnetic field generate and the secondary coil react circuit 13 for reacting the frequency varying generated by the electric magnetic field generate and the secondary coil react circuit 13 and converting it into a power signal.

The rectification circuit 22, for example but not limited to a full-wave rectification circuit or a half-wave rectification circuit, is coupled to the induction coil 21, for rectifying the power signal into a direct current power, the direct current power beside can charge to the rechargeable battery 23, can also provide to the device circuit 24.

The rechargeable battery 23 is coupled to the output terminal of the rectification circuit 22, for providing the direct current power to the portable electronic device 2 for charging. While the rechargeable battery 23 being fully charged, the power of the rechargeable battery 23 can provide the direct current power to the device circuit 24 to execute relatively action. Furthermore, the portable electronic device 2 of the present invention further comprises a switch circuit 25, positioned between the rechargeable battery 23 and the device circuit 24 for controlling the device circuit 24 working or not. Wherein, the switch circuit 25, for example but not limited to a manual or automatic switch, when the switch circuit 25 is a automatic switch, it can be consisted of a transistor circuit, so as to reach the goal of auto switching.

Figure 4:
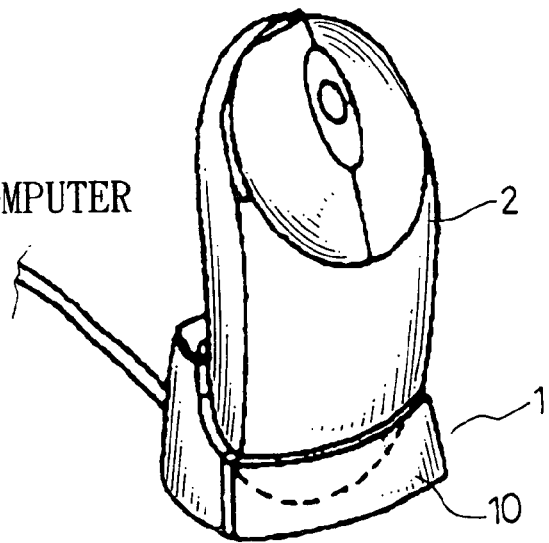
FIG. 4 illustrates a portable electronic device is inserted inside the pulse frequency modulation for induction charge device for charging or locating purpose according to one prefer embodiment of the present invention.

Referring to FIG. 4, which illustrates a portable electronic device is inserted inside the pulse frequency modulation for induction charge device for charging or locating purpose according to one prefer embodiment of the present invention. As shown in the FIG., at first, the portable electronic device 2 of the present invention can be positioned in the reaction region 11 of the base seat 10, at this time the voltage reacted by the secondary coil L12 adding the Vcc voltage will lower than the reference voltage, thus makes the detection and modulation generate circuit 14 continually output pulse signals with higher frequency, and the primary coil L11 generates electric magnetic field while the pulse signals passes it, and then the electric magnetic field is coupled to the induction coil 21 and rectified by the rectification circuit 22, finally, charges to the rechargeable battery 23 so as to reach the goal of effective management the power and overcome the aforesaid drawbacks of the prior art.

Figure 5:
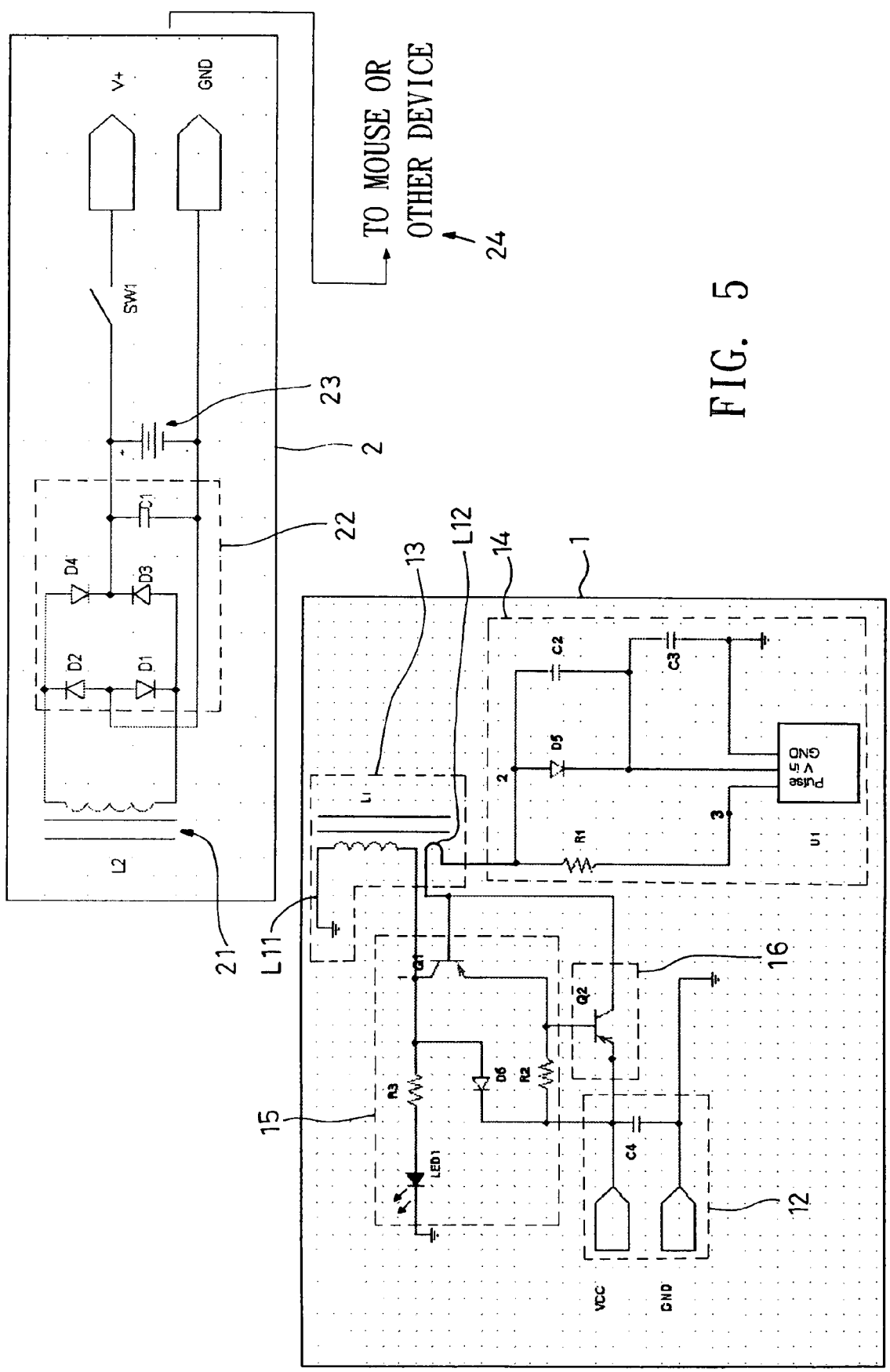
FIG. 5 illustrates a circuit diagram of the pulse frequency modulation for induction charge device 1 and the portable electronic device 2 according to one prefer embodiment of the present invention.
Figure 6:
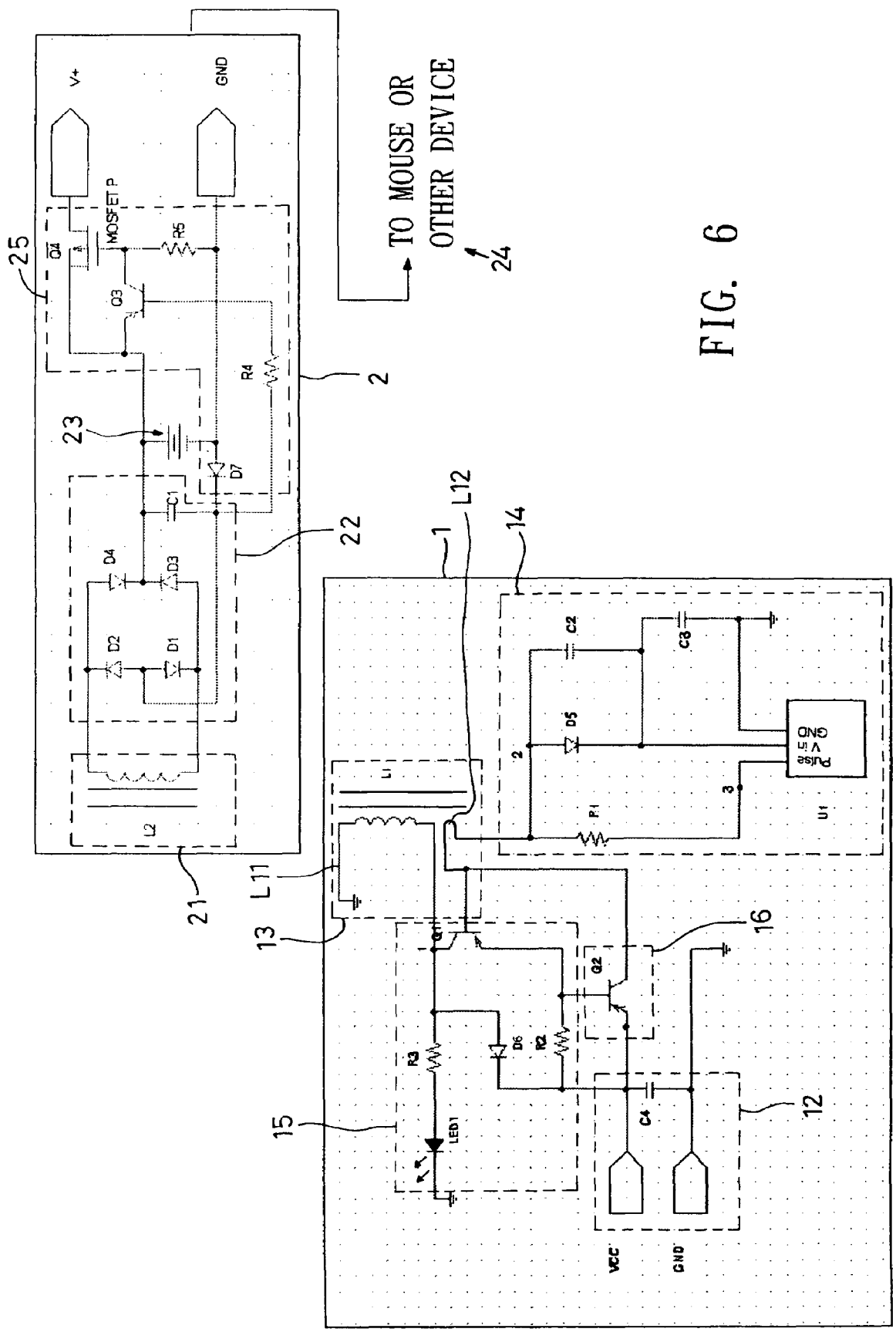
FIG. 6 illustrates a circuit diagram of the pulse frequency modulation for induction charge device 1 and the portable electronic device 2 according to another prefer embodiment of the present invention.

Referring to FIGS. 5 and 6, which respectively illustrates a circuit diagram of the pulse frequency modulation for induction charge device 1 and the portable electronic device 2 according to one prefer embodiment of the present invention. As shown in the FIGS., the working principle of the pulse frequency modulation for induction charge device 1 and the portable electronic device 2 of the present invention is shown as following: at first, the power Vcc is passed to the detection and modulation generate circuit 14 (consists of resistor R1, diode D5, capacitor C2, C3, modulation generating circuit U1) through the power input port 12, control switch circuit 15 (consists of transistor Q1, resistor R2, R6, diode D6, and LED 1), the electric magnetic field generate and the secondary coil react circuit (consists of the primary coil L11 and the secondary coil L12) as the reference voltage. When the voltage lower than the reference voltage, the modulation generating circuit U1 of the detection and modulation generate circuit 14 will continually output pulse signals. When the voltage higher than the reference voltage, the modulation generating circuit U1 of the detection and modulation generate circuit 14 will discontinuity output pulse signals with very low frequency.

When the power is initially inputted, the power voltage is dropped by the aforesaid elements, thus makes the reference voltage lower than the preset voltage (for example but not limited to DC 5V, and can be changed depending on requirement), the detection and modulation generate circuit 14 will output pulse signals to the control switch circuit 15 and actuate the transistor Q1. Further, the primary coil L11 of the electric magnetic field generate and the secondary coil react circuit 13 receives the voltage and generates electric magnetic field. The secondary coil L12 will react a voltage cascaded to the Vcc and supply to the detection and modulation generate circuit 14 when the electric magnetic field of the primary coil L11 is switched, meanwhile the detection and modulation generate circuit 14 can detect the voltage level. At this time, if the primary coil L11 approaches without additionally load (i.e. the induction coil 21, rectification circuit 22 (consists of the diode D1, D2, D3, D4 and capacitor C1), rechargeable battery 23, device circuit 24), the voltage reacted by the secondary coil L12 will increase, and when the voltage level is equal to the reference voltage, the detection and modulation generate circuit 14 will stop outputting the pulse signals, until the voltage is lower than the reference voltage by way of discharging, and the detection and modulation generate circuit 14 will discontinuity output pulse signals with very low frequency and detect the additionally load being appeared or not, so as to prevent power from wasting. Furthermore, the portable electronic device 2 of the present invention further comprises a switch circuit 25 positioned between the rechargeable battery 23 and the device circuit 24 for controlling the device circuit 24 working or not. Wherein, the switch circuit 25 is a manual switch SW1 or automatic switch. If the switch circuit 25 is an automatic switch, please refer to FIG. 6, the switch circuit 25 is consisted of a PMOSFET Q4, resistor R4, R5, transistor Q3 and diode D7.

At present, if the primary coil L11 approaches with additionally load (i.e. the portable electronic device 2), the voltage reacted by the secondary coil L12 will increase, and when the voltage level is equal to the reference voltage, the voltage reacted by the secondary coil L12 will slowly decrease due to the load effect. And the voltage reacted by the secondary coil L12 adding the Vcc voltage will even less the reference voltage when the additionally load even more approaches to the charge device (such as the portable electronic device 2 is positioned in the base seat 10 of the pulse frequency modulation for induction charge device 1, or the heights of the induction coil inside the different type portable electronic device 2 are different and use the same pulse frequency modulation for induction charge device 1). The voltage reacted by the secondary coil L12 adding the Vcc voltage will even less the reference voltage, and the detection and modulation generate circuit 14 will continuity output pulse signals with even higher frequency. The primary coil L11 generates electric magnetic field while the pulse signals passes it, and then the electric magnetic field is coupled to the induction coil 21 and rectified by the rectification circuit 22, finally, charges to the rechargeable battery 23. Therefore, the pulse frequency modulation for induction charge device 1 of the present invention can generate pulse singles with various frequencies according to the load varying generated due to distance varying between the portable electronic device 1 and the charged device, and charge to the portable electronic device 2 according to the pulse singles so as to reach the goal of effective management the power and overcome the aforesaid drawbacks of the prior art.

Although particular embodiments of the invention have been described in detail for purposes of illustration, various modifications and enhancements may be made without departing from the spirit and scope of the invention. Accordingly, the invention is not to be limited except as by the appended claims.

The invention claimed is:

1. An induction charge device assembly comprising:
  a) a portable electronic device having an induction coil; and
  b) an induction charge device having:
    I) an electric magnetic field generate and secondary coil react circuit electrically and magnetically coupled to the induction coil of the portable electronic device and controlling an electromagnetic varying of an electric magnetic field according to a load varying based on a distance between the portable electronic device and the induction charge device;
    ii) a detection and modulation generate circuit being a pulse frequency modulation generate circuit electrically connected to the electric magnetic field generate and secondary coil react circuit and detecting the electromagnetic varying and outputting pulse signals having frequencies corresponding to the electromagnetic varying;
    iii) a control switch circuit electrically connected to the electric magnetic field generate and secondary coil react circuit and selectively turning on and off a transistor switch based on the pulse signals; and
    iv) a power module electrically connected to the control switch circuit and providing power thereto,
  wherein a charge from the induction charge device to the portable electronic device is adjusted according to the pulse signals based on a distance between the portable electronic device and the induction charge device.

2. The induction charge device assembly according to claim 1, wherein the portable electronic device is selected from a group consisting of a wireless home appliance and a wireless computer peripheral device.

3. The induction charge device assembly according to claim 1, wherein the power module is a direct current power and is provided through a device selected from a group consisting of a USB, a PS2 port, and an external power adapter.

4. The induction charge device assembly according to claim 1, wherein the control switch circuit has a transistor circuit.

5. The induction charge device assembly according to claim 1, wherein the control switch circuit has an over load protect circuit limiting current and providing current over load protection.

6. The induction charge device assembly according to claim 1, wherein in the induction charge device further comprises a base seat, the portable electronic device is inserted into the base seat and charged.

7. The induction charge device assembly according to claim 1, wherein the portable electronic device further includes:
  a) the induction coil receiving a frequency of the electric magnetic field generated by the electric magnetic field generate and secondary coil react circuit and converting the frequency into a power signal;
  b) a rectification circuit electrically connected to the induction coil and rectifying the power signal into a direct current power;
  c) a rechargeable battery electrically connected to the rectification circuit and providing the direct current power to the portable electronic device; and
  d) a device circuit electrically connected to the rechargeable battery and controlling the portable electronic device.

8. The induction charge device assembly according to claim 7, wherein the portable electronic device further includes a switch circuit electrically connected between the rechargeable battery and the device circuit, the switch circuit selectively turning the device circuit on and off.

9. The induction charge device assembly according to claim 8, wherein the switch circuit is selected from a group consisting of an automatic switch circuit and a manual switch circuit.

10. An induction charge device assembly comprising:
  a) a portable electronic device having:
    I) an induction coil receiving a frequency of the electric magnetic field generated by the electric magnetic field generate and secondary coil react circuit and converting the frequency into a power signal;
    ii) a rectification circuit electrically connected to the induction coil and rectifying the power signal into a direct current power;
    iii) a rechargeable battery electrically connected to the rectification circuit and providing the direct current power to the portable electronic device; and
    iv) a device circuit electrically connected to the rechargeable battery and controlling the portable electronic device; and
  b) an induction charge device having:
    I) an electric magnetic field generate and secondary coil react circuit electrically and magnetically coupled to the induction coil of the portable electronic device and controlling an electromagnetic varying of an electric magnetic field according to a load varying based on a distance between the portable electronic device and the induction charge device;
    ii) a detection and modulation generate circuit being a pulse frequency modulation generate circuit electrically connected to the electric magnetic field generate and secondary coil react circuit and detecting the electromagnetic varying and outputting pulse signals having frequencies corresponding to the electromagnetic varying; and
    iii) a control switch circuit electrically connected to the electric magnetic field generate and secondary coil react circuit and selectively turning on and off a transistor switch based on the pulse signals,
  wherein a charge from the induction charge device to the portable electronic device is adjusted according to the pulse signals based on a distance between the portable electronic device and the induction charge device.

11. The induction charge device assembly according to claim 10, wherein the portable electronic device is selected from a group consisting of a wireless home appliance and a wireless computer peripheral device.

12. The induction charge device assembly according to claim 10, wherein the induction charge device further comprises a power input port electrically connected to the control switch circuit and providing power thereto.

13. The induction charge device assembly according to claim 10, wherein the control switch circuit has an over load protect circuit limiting current and providing current over load protection.

14. The induction charge device assembly according to claim 10, wherein in the induction charge device further comprises a base seat, the portable electronic device is inserted into the base seat and charged.

15. The induction charge device assembly according to claim 10, wherein the portable electronic device further includes a switch circuit electrically connected between the rechargeable battery and the device circuit, the switch circuit selectively turning the device circuit on and off.

16. The induction charge device assembly according to claim 15, wherein the switch circuit is selected from a group consisting of an automatic switch circuit and a manual switch circuit.

* * * * *